United States Patent
Barrett

(10) Patent No.: US 10,684,324 B1
(45) Date of Patent: Jun. 16, 2020

(54) IC DEVICE AUTHENTICATION USING ENERGY CHARACTERIZATION

(71) Applicant: Science Applications International Corporation, Reston, VA (US)

(72) Inventor: David Michael Barrett, Burtonsville, MD (US)

(73) Assignee: SAIC, Reston, VA (US)

( * ) Notice: Subject to any disclaimer, the term of this patent is extended or adjusted under 35 U.S.C. 154(b) by 0 days.

(21) Appl. No.: 16/713,413

(22) Filed: Dec. 13, 2019

Related U.S. Application Data

(63) Continuation of application No. 16/275,612, filed on Feb. 14, 2019.

(51) Int. Cl.
| | |
|---|---|
| *G01R 31/30* | (2006.01) |
| *G06F 21/44* | (2013.01) |
| *G01R 31/319* | (2006.01) |
| *G01R 31/3185* | (2006.01) |

(52) U.S. Cl.
CPC ..... *G01R 31/3008* (2013.01); *G01R 31/31905* (2013.01); *G01R 31/318588* (2013.01); *G06F 21/44* (2013.01)

(58) Field of Classification Search
CPC ........ G01R 31/3008; G01R 31/318588; G01R 31/31905; G01R 31/2607; G01R 31/26; G06F 21/44
See application file for complete search history.

(56) References Cited

U.S. PATENT DOCUMENTS

| | | |
|---|---|---|
| 6,848,049 B1 | 1/2005 | Tailliet |
| 7,840,803 B2 | 11/2010 | Clarke et al. |
| 9,970,986 B2 | 5/2018 | Hampel et al. |
| 10,019,565 B2 | 7/2018 | Ewing |
| 2005/0116307 A1 | 6/2005 | De Jongh et al. |
| 2006/0041402 A1 | 2/2006 | Baker |
| 2009/0099830 A1 | 4/2009 | Gross et al. |
| 2009/0309621 A1 | 12/2009 | Hammerschmidt |
| 2010/0241864 A1 | 9/2010 | Kelley et al. |
| 2012/0226463 A1 | 9/2012 | Keller, III et al. |
| 2013/0108145 A1 | 5/2013 | Cobb et al. |
| 2013/0147511 A1 | 6/2013 | Koeberl et al. |
| 2015/0067422 A1 | 3/2015 | Hamilton |
| 2015/0137830 A1 | 5/2015 | Keller, III et al. |
| 2017/0067961 A1 | 3/2017 | O'Flynn |

OTHER PUBLICATIONS

Nokomis, Inc., Nokomis System Features and Benefits Page, retrieved from; http://nokomisinc.com/adec%e2%80%a8-features-and-benefits. html (Sep. 25, 2018).
He Huang, Alexandre Boyer, Sonia Ben Dhia. The detection of counterfeit integrated circuit by use of electromagnetic fingerprint. EMC Europe 2014, Sep. 2014, Gothenburg, Sweden. pp. 1-5, 2014. <hal-01068129>.
008240.00031—International Search Report & Written Opinion—dated Nov. 11, 2019.

*Primary Examiner* — Manuel L Barbee
(74) *Attorney, Agent, or Firm* — Banner & Witcoff, Ltd.

(57) ABSTRACT

Systems, methods, and apparatuses are described for verifying the authenticity of an integrated circuit device. An integrated test apparatus may use quiescent current and/or conducted electromagnetic interference readings to determine if a device under test matches the characteristics of an authenticated device. Deviations from the characteristics of the authenticated device may be indicative of a counterfeit device.

20 Claims, 7 Drawing Sheets

US 10,684,324 B1

IC DEVICE AUTHENTICATION USING ENERGY CHARACTERIZATION

This application is a continuation of and claims priority to co-pending U.S. application Ser. No. 16/275,612 filed Feb. 14, 2019, and entitled "IC Device Authentication Using Energy Characterization," which is incorporated herein by reference in its entirety.

GOVERNMENT LICENSE RIGHTS

This invention was made with government support under Contract "Counterfeit Electronics Avoidance and Detection, DOTC-16-01 INIT0950" awarded by the Defense Ordnance Technology Consortium. The government has certain rights in the invention.

BACKGROUND

Sourced components may be required to conform to particular specifications or match certain architectures. A manufacturer may specify particular makes and models of integrated circuit devices to be used in a product. However, part suppliers may intentionally or unintentionally provide devices that may partially conform to requirements, but that may be defective or a fraudulent (e.g., counterfeit) device. In some instances, counterfeit devices may generally mimic the behavior of the devices they copy, even though they may have a reduced reliability, reduced operational life and/or other drawbacks.

SUMMARY

This Summary is provided to introduce a selection of several exemplary concepts in a simplified form as a prelude to the Detailed Description. This Summary is not intended to identify key or essential features.

An integrated test apparatus may determine whether an unauthenticated integrated circuit device conforms to expected standards (e.g., determine if the device is of the make, model, and/or manufacturer expected). The integrated test apparatus may measure a quiescent current produced by the device under test, at multiple voltage steps, and without a load. The quiescent current measurements may be compared to measurements from an authenticated device for authentication. The integrated test apparatus may also or alternatively determine conducted electromagnetic interference produced by the unauthenticated device under test at load. The conducted electromagnetic interference may be compared to measurements from an authenticated device for authentication. The integrated test apparatus may indicate whether an unauthenticated device meets requirements (or, e.g., whether it is counterfeit) based on the results of the one or more comparisons to measurements of the authenticated device.

These and other features are described in more detail below.

BRIEF DESCRIPTION OF THE DRAWINGS

Some features are shown by way of example, and not by way of limitation, in the figures of the accompanying drawings and in which like reference numerals refer to similar elements.

DETAILED DESCRIPTION

Integrated circuit (IC) devices may have measurable characteristics that are consistent for a given implementation of a device. An implementation of a device may comprise a particular architectural design as manufactured by a particular entity. Even slight variations, such as the use of different sub-components, materials, or architectural variations, may produce different characteristics, affect reliability, and/or affect an operation lifetime of the device.

A given implementation of an IC device may have particular electromagnetic interference (EMI) characteristics. EMI characteristics may comprise a pattern of electromagnetic emissions produced by an IC device under a static and/or dynamic load. For example, an IC device may produce a unique EMI signature under a static voltage and/or when given a particular series of inputs (e.g., a stepped voltage, digital inputs in a sequence, etc.). EMI may comprise detectable electromagnetic emissions, such as conducted EMI and/or radio-frequency emissions. EMI may also comprise disturbances on a power flowing from a power source to the IC device. For example, conducted EMI may comprise high frequency disturbances that are present on a connection to a positive terminal (e.g., power input) of an IC device.

A given implementation of an IC device may have particular quiescent current (QC) characteristics. QC characteristics may comprise current draw on one or more power inputs and/or outputs of an IC device, such as when the IC device has no load and/or when the IC device is receiving no substantive inputs (e.g., no analog or digital inputs and/or operating in an idle state). For example, an IC device may produce a unique QC signature under steady-state power with no other inputs. This may be the result of internal characteristics of the IC (e.g., the architecture, capacitance, resistance, inductance, etc.). QC current may be detectable at the one or more power inputs of the IC as an in-line current measurement.

Testing for EMI and/or QC characteristics may provide a reliable and efficient method for determining the authenticity of an unauthenticated device (e.g., determining whether an unauthenticated IC device conforms to required specifications and/or is of the manufacturer, make, and/or model listed). By comparing the EMI and/or QC characteristics of the unauthenticated IC device to those of an authenticated IC device (e.g., a known, conforming IC device), the authenticity of an unauthenticated IC under test may be determined.

Figure 1:
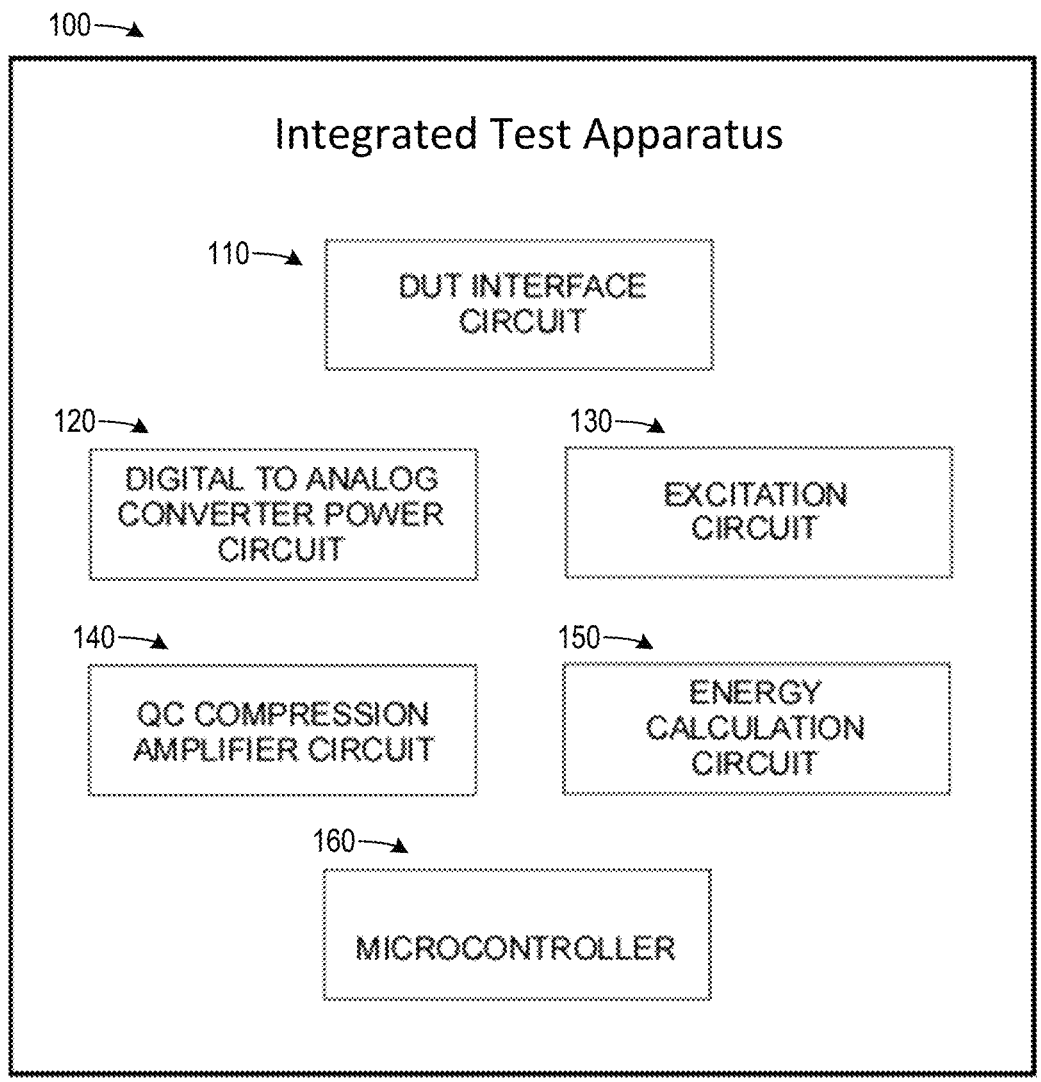
FIG. 1 shows an example integrated test apparatus for integrated circuit verification and testing.

FIG. 1 shows an example integrated test apparatus for IC device verification and testing. This example may provide both QC and conducted EMI capabilities. The integrated test apparatus 100 may comprise one or more components that may work in conjunction to verify that an IC device conforms to required specifications (e.g., that it is the requested make and model from a given manufacturer). An IC device under test (DUT) interface circuit 110 may provide an interface to an unauthenticated IC device undergoing testing (e.g., a DUT). For example, the DUT interface circuit 110 may comprise a socket into which the DUT may be inserted. The DUT interface circuit 110 may be connected to one or more other components of the integrated test apparatus 100 such that the DUT inserted into the DUT interface circuit 110 is electrically connected to the one or more other components of the integrated test apparatus 100.

Figure 6:
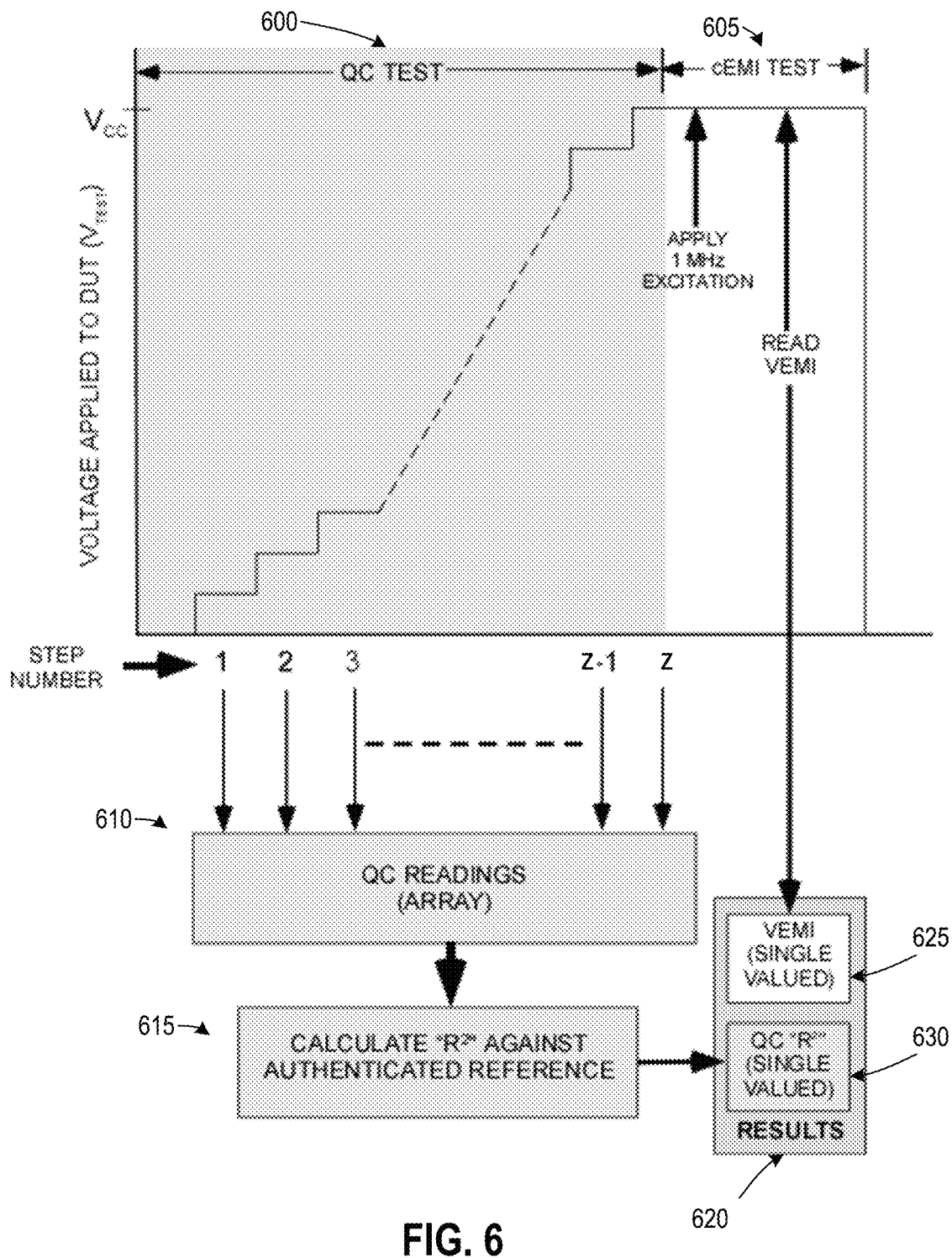
FIG. 6 shows an example of an integrated testing curve.

The integrated test apparatus 100 may comprise one or more components that may be connected to power inputs of the DUT interface circuit 110. For example, power inputs for an IC device socket of the DUT interface circuit 110 may be connected to one or more of a digital to analog converter power circuit 120, an excitation circuit 130, or a microcontroller 160. The digital to analog converter (DAC) power circuit 120 may comprise a DAC power circuit configured to generate a direct current (DC) voltage source. The DAC power circuit 120 may derive a direct current voltage from an alternating current input power source (e.g., a wall socket). The DAC power circuit 120 may be configured to allow for multiple voltages, which may step up in voltage over time. For example, the DAC power circuit 120 may provide 1V at a first time, 2V at a second time, 2 V at a second time, . . . 11V at an eleventh time, and then 12V as a steady-state voltage afterwards. FIG. 6 provides an example of such or similar operation.

The excitation circuit 130 may provide an input to the DUT to excite conducted EMI on the power inputs of the DUT. For example, the excitation circuit 130 may provide an oscillating analog or digital input to the DUT interface circuit 110, which may be configured to provide that oscillating analog or digital input to the DUT.

The microcontroller 160 may control one or more aspects of the integrated test apparatus 100. The microcontroller may control general operation of the integrated test apparatus 100, such as by turning on a power supply or switching on an input. For example, the microcontroller 160 may control the excitation circuit 130 generating an excitation input to the DUT.

The integrated test apparatus 100 may comprise one or more components that may measure signals via connections to the DUT interface circuit 110. A QC compression amplifier circuit 140 may be connected to the DUT interface circuit 110 to detect QC draw from the DUT. For example, the QC compression amplifier circuit 140 may be connected to power inputs to (or outputs from) the DUT interface circuit 110 (e.g., in-line from the DAC power circuit 120). The QC compression amplifier circuit 140 may generate a compressed reading of QC generated by an excited DUT for measurement by the microcontroller 160.

An energy calculation circuit 150 may be configured to read EMI characteristics of the DUT (e.g., conducted EMI on the power inputs of the DUT). For example, the energy calculation circuit 150 may be configured to read conducted EMI on a connection between a DAC power circuit 120 and the DUT interface circuit 110. The energy calculation circuit 150 may transmit those readings to the microcontroller 160 for further processing and/or reporting.

Figure 2:
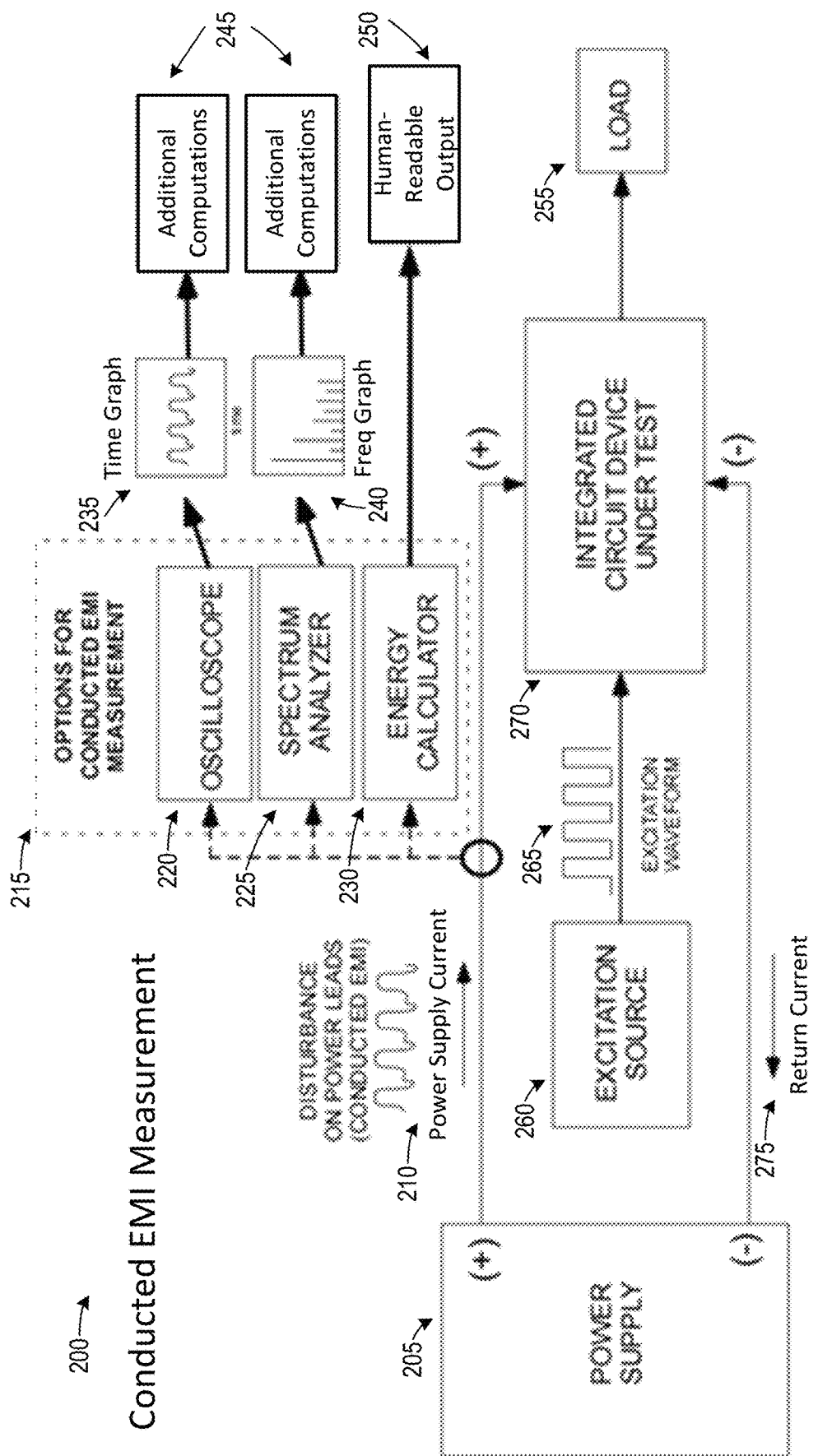
FIG. 2 shows an example of a conducted electromagnetic interference measurement system.

FIG. 2 shows an example of a conducted EMI measurement system 200. The EMI measurement system 200 may comprise one or more components of the integrated test apparatus 100. The EMI measurement system 200 may detect conducted EMI for a DUT 270 using a power supply 205, an excitation source 260, and/or a load 255. The DUT 270 may be a DUT in the DUT interface circuit 110.

The power supply 205 may comprise a voltage source. The power supply 205 may be a DAC power circuit 120. The power supply 205 may provide a power supply current 210 to a DUT 270. The DUT 270 may be provided an input from an excitation source 260 which may comprise an excitation waveform 265. The DUT 270 may drive a load 255 (e.g., a linear resistor). The DUT 270 may feed return current 275 to the power supply 205. In some instances, the current direction may be reversed from that shown in FIG. 2 (e.g., current may be depicted as the flow of electrons, which may be opposite to the current flow depicted).

The power supply current 210 may comprise power fluctuations (e.g., conducted EMI induced by the excitation waveform 265 to the DUT 270). One or more devices 215 capable of conducted EMI measurement may be connected (e.g., in-line, which may refer to a connection in series between the power supply 205 and the DUT 270) to the positive voltage lead for the DUT 270. One device may be oscilloscope 220, which may produce a time graph 235 which may display the conducted EMI on the positive supply voltage source as a function of time. Another device may be a spectrum analyzer 225, which may provide a frequency graph 240 which displays various frequency components of the EMI conducted on the positive supply voltage input to the DUT 270. These may be displayed to a user and/or may be fed to a device (e.g., the microcontroller 160) for additional computations 245. The additional computations 245 may, for example, comprise comparisons of graphed results with those of known (e.g., baseline) devices. The additional computations 245 may be used to generate other outputs, such as human-readable outputs.

Energy calculator 230 may be a circuit and/or computational device which may produce human-readable output 250. The human-readable output 250 may be a simple output, such as a number or indicator that is representative of the energy associated with the conducted EMI (e.g., "133"). A reading within a given range may be indicative of a verified DUT. The energy calculator 230 may be configured to compare the conducted EMI of the DUT 270 with the conducted EMI of an authenticated device. The human-readable output 250 may comprise an indication of variance (e.g., an r-squared value) or a simple yes/no output (e.g., a red light glowing for a successful test).

The conducted EMI may be characterized in the time domain (with an oscilloscope-like capability) and/or in the frequency domain (with a spectrum analyzer-like capability). The analyses in the time and/or frequency domain may be equally effective. However, a disadvantage of both is that relatively high-level instrumentation (either an oscilloscope or spectrum analyzer) may be required for the measurement, initial processing, and recording of the EMI data. In addition, comparing the results of time domain or frequency domain information with those of authenticated devices may require significant additional post-processing capabilities. As such, these conducted EMI measurement/analysis approaches may complicate the overall hardware and processes for an IC device authentication system. The approach of using an analog energy calculation circuit (e.g., the energy calculator 230) for the characterization of the conducted EMI significantly may simplify the authentication hardware and process. The analog calculation circuit may generate a single scaler value which can be compared directly with that of an authenticated device, therefore facilitating an authentication system that may be simpler, smaller, and less expensive.

Figure 3:
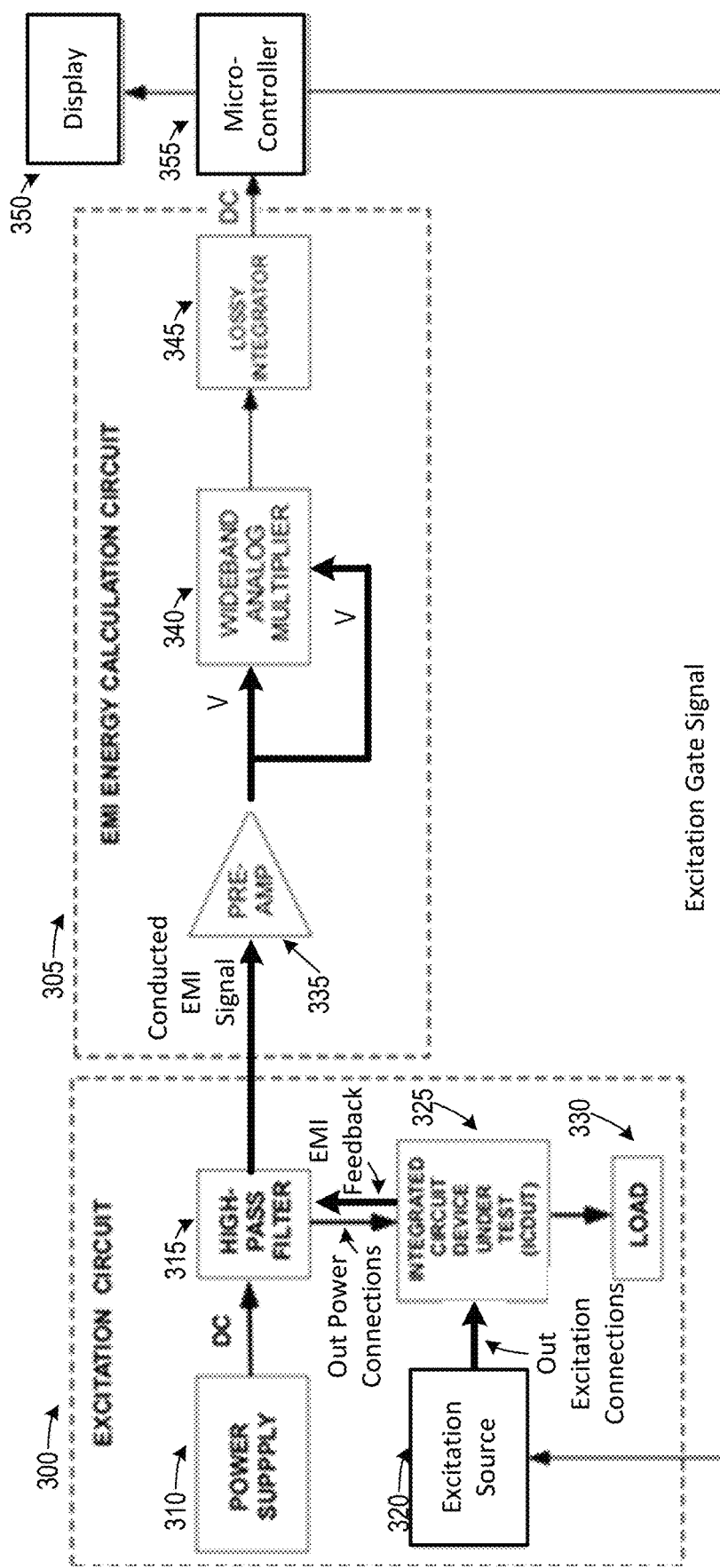
FIG. 3 shows an example of an excitation circuit and an electromagnetic interference energy calculation circuit.

FIG. 3 shows an example of an excitation circuit 300 and an EMI energy calculation circuit 305. The excitation circuit 300 may be the excitation circuit 130. The EMI energy calculation circuit 305 may be an implementation of the energy calculator 230. The excitation circuit 300 may provide power and input signals to a DUT 325. The DUT 325 may be a DUT in the DUT interface circuit 110. The EMI energy calculation circuit 305 may be connected to the power signals (e.g., via a high-pass filter 315) in order to read a conducted EMI signal. The output of the EMI energy calculation circuit 305 may be fed to a microcontroller 355, which may analyze the conducted EMI characteristics, and display those characteristics (or an analysis of those characteristics, such as how the characteristics correspond to an authenticated IC) on a display 350. The microcontroller 355 may also facilitate storage of test data and/or communication of test data to a higher-level information system. The display 350 may display the results of a test and any other pertinent information (e.g., the device type that is being tested, date and time) that may be related to the test.

The excitation circuit 300 may comprise a power supply 310 that feeds direct current power to a high pass filter 315. The excitation circuit 300 may be the excitation circuit 130. The power supply 310 may be the DAC converter power circuit 120. The high pass filter 315 (which may be a crossover filter) may pass the direct current from the power supply 310 to the DUT 325. The DUT 325 may receive an input from an excitation source 320. The input may comprise an oscillating waveform input (e.g., operating at one of several possible frequencies at 1 Mhz, 10 Mhz, 10 Khz, etc.). The excitation source 320 may be crystal-controlled. The excitation output may be a square wave signal (e.g., a square wave at 5V). The excitation source 320 may be connected via buffer circuits, which may prevent input loading characteristics of the DUT 325 from affecting the operating characteristics of the excitation source 320. The DUT 325 may also drive a load 330. The microcontroller 355 may control or provide the excitation source 320. For example, the microcontroller 355 may be configured (e.g., preconfigured, or controlled using a user interface) to control the excitation source 320 (e.g., instruct an excitation device to operate as the excitation source 320 at an instructed frequency or time) or may provide the excitation source 320 via an output of the microcontroller 355.

The high pass filter 315 may comprise a filter which extracts high frequency signals associated with the conducted EMI conducted on the power input to DUT 325. The high pass filter 315 may redirect those components (e.g., high frequency signals) to the EMI energy calculation circuit 305 to the input of pre-amplifier 335. The EMI energy calculation circuit 305 may be the energy calculation circuit 150. The pre-amplifier 335 may amplify the high frequency components (e.g., with a gain of 3.8 and a bandwidth of at least 150 Mhz), and provide the amplified high frequency components to a wideband analog multiplier 340. The wideband analog multiplier 340 may apply a squaring operation to the amplified high frequency components, and may be followed by a lossy integrator 345. Both inputs to the wideband analog multiplier 340 may be amplified conducted EMI signals. Both inputs may be the same signal. The output of the wideband analog multiplier 340 may be proportional to the square of the conducted EMI signal.

One or more amplified conducted EMI signals may be represented as a series of cosine and sine functions:

$$V_{EMI}(t) = \sum_{n=1}^{\infty} (a_n \cdot \cos(2\pi n f_o t) + b_n \cdot \sin(2\pi n f_o t))$$

where $f_o$=the fundamental frequency of the excitation waveform. Squaring $V_{EMI}(t)$ may yield:

$$V_{EMI}^2(t) = \left\{ \sum_{n=1}^{\infty} (a_n \cdot \cos(2\pi n f_o t) + b_n \cdot \sin(2\pi n f_o t)) \right\}^2$$

The squaring operation may result in squares of like terms, such as:

$$(a_2 \cdot \cos(4\pi f_o t))^2 + (a_4 \cdot \cos(8\pi f_o t))^2 + (a_6 \cdot \cos(12\pi f_o t))^2 + \ldots$$

$$(b_1 \cdot \cos(2\pi f_o t))^2 + (b_3 \cdot \cos(6\pi f_o t))^2 + (b_5 \cdot \cos(10\pi f_o t))^2 + \ldots$$

For each square of like terms, the results may be simplified using the appropriate trigonometric identity as follows:

$$a_n^2 \cdot (\cos(2\pi n f_o t))^2 = \frac{a_n^2}{2} + \frac{a_n^2}{2} \cdot \cos(4\pi n f_o t)$$

$$b_n^2 \cdot (\sin(2\pi n f_o t))^2 = \frac{b_n^2}{2} - \frac{b_n^2}{2} \cdot \cos(4\pi n f_o t)$$

Therefore, the square of each like term at the output of the wideband analog multiplier 340 may produce a constant time invariant term (a "DC term"). Furthermore, these DC terms may be additive across the entire series and may represent the square of the EMI signal. Therefore, the total DC signal at the output of the multiplier circuit may be a resultant waveform given by:

$$V_{DC} = \frac{1}{2} \cdot \sum_{n=1}^{\infty} a_n^2 + b_n^2$$

This signal may be proportional to the total energy associated with the conducted EMI signal and may be used as a marker for the characterization of the conducted EMI. This signal may appear at the output of the wideband analog multiplier 340 in the midst of the other time-varying products that are produced as a result of the squaring operation. Therefore, it may be advantageous to filter the time-varying components to provide for an accurate reading of the direct current voltage for the characterization of the conducted EMI.

The lossy integrator 345 may process the input received from the wideband analog multiplier 340, and transmit a resultant reading to the microcontroller 355. The lossy integrator 345 may filter the DC component from the output of the analog multiplier circuit. The lossy integrator 345 may provide a relatively short charging time (e.g., ~10 us) with a much longer discharge time (e.g., ~330 us). This combination of charge/discharge times may provide an approximated average of the output of the multiplier circuit. As such, the lossy integrator may provide a clean direct current output level voltage which can be read with a multi-meter or posted on the display 350 via the microcontroller 355. The lossy integrator 345 may also provide additional gain so as to increase the span and resolution of the direct current signal level. Thus, the EMI energy calculation circuit 305 may process the conducted EMI signal by using the wideband analog multiplier 340 and the lossy integrator 345 to produce a single direct current voltage that is a representation of the energy (e.g., the total energy across the spectrum) of the conducted EMI signal.

Figure 4:
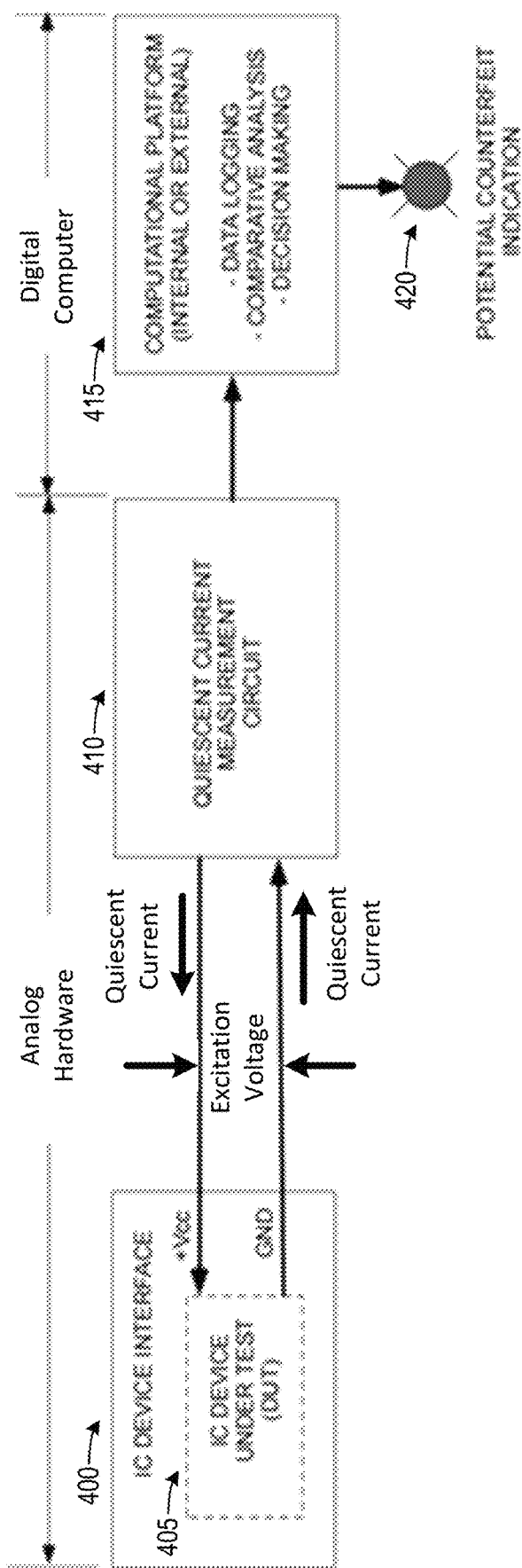
FIG. 4 shows an example system for performing integrated circuit verification using QC detection and analysis.

FIG. 4 shows an example system for performing IC device authentication using QC detection and analysis. An IC device Interface 400, which may be a DUT interface circuit 110, may provide a connection to a DUT 405. A QC measurement circuit 410, which may comprise a QC compression amplifier circuit 140, may measure QC generated by the DUT 405. A computational platform 415 may collect the QC data and perform the necessary comparative analysis and decision processes to determine if the DUT 405 meets requirements. The computational platform 415 may comprise one or more computer processors and memory, performing one or more methods described herein (e.g., performing steps 745, 755, and 760 of FIG. 7). The IC device interface 400 facilitates electrical connections between pins of the DUT 405 to the QC measurement circuit 410. The IC device interface 400 may use commercially available test sockets that enable the DUT 405 to be easily and quickly inserted and extracted without any damage to leads of the DUT 405. QC characterization may, in at least some examples, only require electrical connections to the power supply leads of the DUT 405. This may involve connecting to two leads of the DUT 405 (e.g., +Vcc and GND). The IC device leads connected to the QC measurement circuit 410 may be adjusted manually or automatically (e.g., upon instruction from a microcontroller). The QC measurement circuit 410 may provide a result to the computational platform 415. The computational platform 415 may perform data logging, comparative analysis, and/or decision making to determine if the DUT 405 meets requirements. An indication of whether a DUT 405 meets requirements (e.g., if an IC device is or is not counterfeit) may be made using an indicator such as a potential counterfeit indication 420. The potential counterfeit indication 420 may be a user-readable output, such as a light (e.g., red for failure and/or green for passing), a terminal output (e.g., the word "failure" displayed on a terminal), or any other indication suitable to indicate a test failure to a user.

Figure 5:
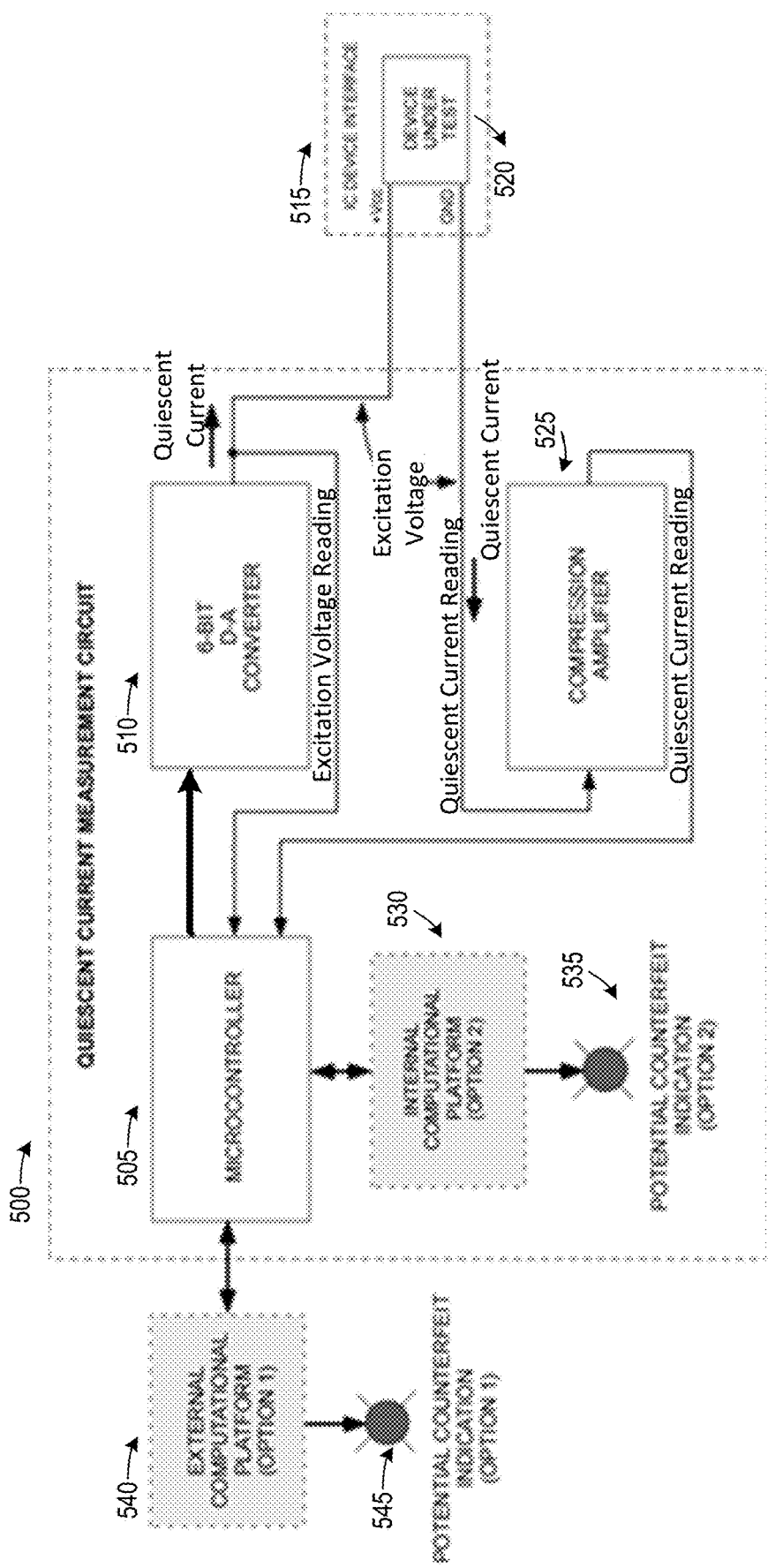
FIG. 5 shows an example of a quiescent current measurement circuit.

FIG. 5 shows an example of a QC measurement circuit 500. The QC measurement circuit 500 may comprise one or more components of the integrated test apparatus 100. The QC measurement circuit 500 may provide an excitation voltage to a DUT and facilitate measurement and characterization of the quiescent current flowing through the DUT. An excitation voltage, which may increase over a number of incremental steps, may be provided by a digital-to-analog converter (DAC) 510. A microcontroller 505, which may be a microcontroller 160, may control the DAC 510. The microcontroller may send a communication (e.g., a 6-bit binary word) to the DAC 510, which may produce a voltage ramp at its output (e.g., a voltage ramp having 64 discrete steps). Command words may comprise any number of bits in order to achieve the desired excitation voltage accuracy. The DAC 510 may be augmented by incorporating a voltage amplifier which drives a transistor-based emitter-follower (a "voltage-follower"). The voltage amplifier may allow the overall excitation voltage span to be determined independently from the DAC 510 circuitry. The overall span of the excitation voltage may be adjusted (e.g., from 0-15 VDC) depending on the gain of the voltage amplifier. The voltage amplifier may drive the voltage-follower which may isolate the load impedance of the DUT 520 from the voltage amplifier. This may enable the circuit to provide a wide range of currents to various IC device types without affecting the level of the excitation voltage.

The output of the DAC 510 may provide a positive excitation voltage to the +Vcc lead of the DUT 520 through the IC device interface 515. The IC device interface 515 may be a DUT interface circuit 110. Current from the voltage-follower may be conducted through the DUT 520 and returned, from the GND lead through the IC device interface 515, to the input of the compression amplifier 525. The return current may flow through a current-viewing-resistor (CVR) which may produce a voltage that is proportional to the QC that is returned from the DUT 520. This resulting voltage may be used to characterize the QC flowing through the DUT 520 as a function of the excitation voltage. Since the QC can range over several orders-of-magnitude, both with reference to the changing excitation voltage and/or the variety of IC devices that may be tested, the voltage from the CVR may be processed through the compression amplifier 525. The compression amplifier 525 may have a non-linear gain (e.g., providing more voltage gain to smaller input voltage signals and less gain to larger input voltage signals). This may enable the recording of the QC over a wide range without the need to manually change amplification factors. The gain characteristics (gain versus input voltage) of the compression amplifier may be characterized and used in the computational processes to characterize the QC of the DUT 520 as a function of the excitation voltage.

As a DUT 520 is being tested, the microcontroller 505 may increment the command word to the digital-to-analog converter. This results in an increasing excitation voltage applied to the DUT 520 that increments based on the command word. In an example for a 6-bit configuration (64 steps), the excitation voltage may increment in 63 steps from zero to the maximum voltage level over a total period of 15-60 seconds. Both the excitation voltage level and the compressed QC value may be read back to the microcontroller 505. The microcontroller 505 may store the excitation voltage/QC values as an internal array or communicate these values to an another computational platform (e.g., external computational platform 540 or internal computational platform 530). The external computational platform 540 and/or internal computational platform 530 may comprise one or more computer processors and memory, performing one or more methods described herein (e.g., performing steps 745, 755, and 760 of FIG. 7). The excitation voltage/QC data may be subsequently subjected to a comparative analysis to determine if the DUT 520 meets requirements (or potentially could be a counterfeit device). The computational platforms may produce an indication of the result (e.g., potential counterfeit indication 545 or potential counterfeit indication 535). The potential counterfeit indication 545 and/or potential counterfeit indication 535 may be a user-readable output, such as a light (e.g., red for failure and/or green for passing), a terminal output (e.g., the word "failure" displayed on a terminal), or any other indication suitable to indicate test results to a user.

Several techniques may be used to quantitatively compare measured QC and conducted EMI characteristics from a DUT 520 with authenticated characteristics of an authenticated device. The baseline QC and conducted EMI characteristics (which may be displayed using a curve) may be obtained by performing QC and/or conducted EMI testing (e.g., using the systems and methods described herein) on a device known to be genuine (e.g., a device sent by the manufacturer as a sample for testing). These may include correlation analysis or statistical analysis (e.g., Z-score or variance analysis). These results may be used to gauge the overall variance of the data regarding a device under test with the baseline on a point-by-point basis. Relatively small variances from the QC and conducted EMI baseline may be indicative that the DUT 520 is authentic. Larger variances with reference to the baseline data may indicate that the DUT 520 may potentially be counterfeit. Some embodiments may automatically compare the measured QC characteristics with that of the baseline. Some embodiments may automatically determine if the DUT 520 is an authentic device or is seen as potentially counterfeit.

FIG. 6 shows an example of an integrated testing curve. An integrated test apparatus 100 may initially perform a QC test 600 on a DUT, and then perform a conducted EMI test 605 on the DUT when steady-state voltage is achieved. The QC test 600 may be performed, wherein the voltage applied to the power inputs of the DUT may be incrementally stepped from 0 to z (e.g., Vcc). Voltage measurements may be read into an array 610 with each value corresponding to each step. The integrated test apparatus 100 may then calculate an r-squared value 630 based on the measurements stored in array 610 and an authenticated reference IC. If this measurement is outside a tolerance (e.g., 0.001), then a counterfeit device may be indicated. For example, a device with an r-squared of 0.998797 may be genuine, while a device with an r-squared of 0.874919 may be counterfeit.

After stepping the applied voltage z steps during the QC test 600, steady-state voltage may be achieved. The integrated test apparatus 100 may then apply an excitation signal (e.g., 1 MHz) to the DUT (e.g., according to methods and systems described herein). For example, the excitation circuit 130 may apply an excitation signal to one or more inputs of the DUT, and EMI signals from the power circuit may be passed through the EMI energy calculation circuit 150 for reading and storage by the microcontroller 160. The integrated test apparatus 100 may read the EMI voltage as a single EMI value 625. For example, an authenticated voltage may be 1.401 volts, and a tolerance may be 10%. In this example, a reading of 1.5 volts may indicate a genuine device, while a reading of 1.7 volts may indicate a counterfeit device.

The results 620, which may comprise the r-squared value 630 (e.g., for the QC measurement) and/or the EMI value 625, may be displayed to a user and/or analyzed for authentication. For example, if one of the r-squared value 630 and/or the EMI value 625 (or a variable computed from both) falls outside an allowable range, the DUT may be identified as failing to meet requirements (e.g., as a counterfeit).

Figure 7:
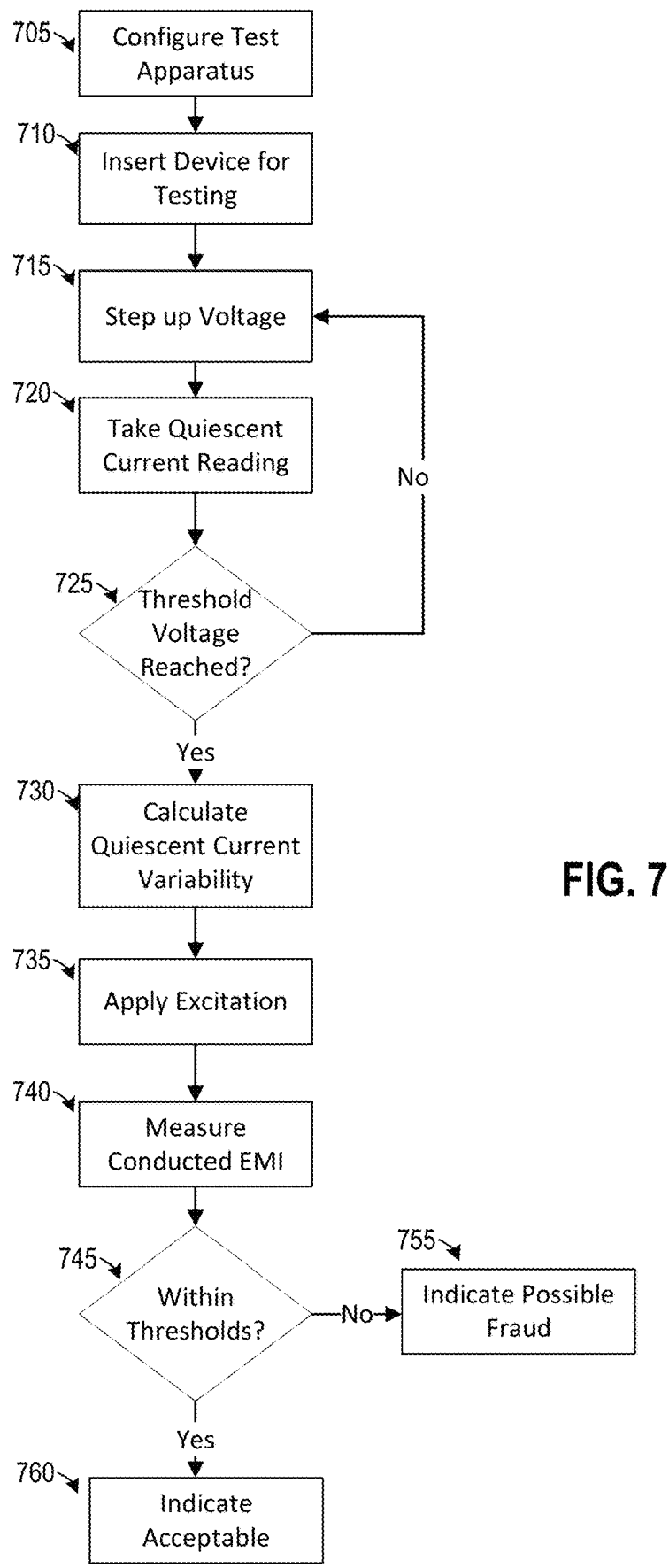
FIG. 7 shows an example method for integrated quiescent current and conducted electromagnetic interference testing.

FIG. 7 shows an example method for integrated QC and conducted EMI testing. A test apparatus, such as an integrated test apparatus 100, may enable the authentication of a DUT. At step 705, the test apparatus may be configured for testing. The configuration may comprise parameters for operability with a DUT. For example, a DUT interface circuit 110 may be programmed in hardware or software to interface various components (e.g., Vcc, digital/analog inputs, digital/analog outputs, etc.) with connection to appropriate leads for a given DUT. The configuration may comprise operating characteristics specific for the device being tested. For example, the test apparatus may be configured to step up voltage at a certain rate and/or to a certain threshold voltage (e.g., 1 V every 0.05 seconds until 12 V), and may be configured to run a conducted EMI test at steady state for a certain time (e.g., 0.1 seconds). At step 710, a DUT may be inserted into the test socket for testing.

At step 715, the test apparatus may step up voltage for the DUT. A voltage source may increase a voltage to a point based on a configuration (e.g., increase voltage from 1V to 2V). At step 720, the test apparatus may take a quiescent current reading. For example, the test apparatus may take a QC reading as described above in FIG. 4 or FIG. 5. At step 725, the test apparatus may determine if a threshold voltage (e.g., Vcc) has been reached. The threshold voltage may be a steady-state voltage (e.g., an operation voltage of the DUT). When the threshold voltage is reached (e.g., at the steady-state voltage), the test apparatus may proceed with calculating QC variability (e.g., an r-squared value) at step 730. If the threshold voltage has not been reached, the test apparatus may continue to incrementally step up voltage and take readings as in steps 715 and step 720.

At step 730, the test apparatus may calculate QC variability. The QC variability may be a representation of the current drawn by the DUT at each step of the voltage test (e.g., compared to an authenticated device). The QC variability may be analyzed as a fixed value, or as a matrix of values, such as according to the systems and methods described herein.

At step 735, the test apparatus may apply an excitation to the DUT. The excitation may be a waveform, such as a square wave or an alternating voltage, applied to an input of the DUT (e.g., an input other than the power leads). At step 740, the test apparatus may read one or more voltages (e.g., VEMI) corresponding to conducted EMI produced on power leads of the DUT. The conducted EMI may comprise frequency signals that are imposed upon a direct current power source to the DUT. Further discussion of conducted EMI may be found, for example, in the discussions of FIG. 2 and FIG. 3.

At step 745, the test apparatus may determine if the QC r-squared and conducted EMI readings are within thresholds. Thresholds may be based on known values corresponding to authenticated devices. Multiple authenticated devices (e.g., devices supplied by a manufacturer) may be tested for tolerances. For example, ten samples may be tested to determine a range of QC and conducted EMI readings. Thresholds may be set based on those readings, such as setting a threshold range from any of the tested devices. For example, if a tested range is 1.4 to 1.6 volts, a threshold may be set at 10% above and below the tested range (e.g., the threshold for a passing test must be between 1.25 volts and 1.75 volts). A DUT meeting thresholds (e.g., within a threshold range) may be authenticated based on having QC and conducted EMI characteristics sufficiently similar to an authenticated device in order to verify that the DUT meets requirements (e.g., is of the same make, model, and/or manufacturer as the authenticated device). A device not satisfying a threshold may be a device that falls outside a threshold range (e.g., a device at 1.1 volts for a range of 1.25 to 1.75 volts). Thresholds may be evaluated based on independent or combined readings. For example, the test apparatus may determine if either of the QC variability readings or the conducted EMI readings fall outside a threshold. In another example, the test apparatus may calculate a combined value based on both the QC variability reading and the EMI reading, and then evaluate that value against the threshold. If thresholds are not met (e.g., if r-squared and/or EMI values are not within the threshold), a possible counterfeit device may be indicated at step 755. For example, a buzzer may sound, a red light may be illuminated, and/or an indication may be made on a display. If thresholds are met (e.g., if r-squared and/or EMI values are within the threshold), then the device may be indicated as acceptable and/or be authenticated. For example, a chime may sound, a green light may be lit, and/or an indication may be made on a display. In some embodiments feedback may only be given for one of a pass or a failure (e.g., an alarm may sound for failing to meet a threshold, and no sound may be made if the DUT readings meet the thresholds).

The foregoing has been presented for purposes of example. The foregoing is not intended to be exhaustive or to limit features to the precise form disclosed. The examples discussed herein were chosen and described in order to explain principles and the nature of various examples and their practical application to enable one skilled in the art to use these and other implementations with various modifications as are suited to the particular use contemplated. The scope of this disclosure encompasses, but is not limited to, any and all combinations, subcombinations, and permutations of structure, operations, and/or other features described herein and in the accompanying drawing figures.

The invention claimed is:

1. A method comprising:
   determining, based on application of a first voltage to an unauthenticated integrated circuit (IC) device, a first quiescent current (QC) reading for the unauthenticated IC device;
   determining, based on the first QC reading, a first tested QC value;
   determining, after determining the first QC reading and by application of a second voltage to the unauthenticated IC device, a second QC reading for the unauthenticated IC device;
   determining, based on the second QC reading, a second tested QC value;
   determining, based at least in part on:
      a first difference between the first tested QC value and a first expected QC value of one or more expected QC values associated with an authenticated IC device, and
      a second difference between the second tested QC value and a second expected QC value of the one or more expected QC values,
   one or more variability values;
   determining, based at least in part on the one or more variability values, that a threshold is not satisfied; and
   outputting an indication that the threshold is not satisfied.

2. The method of claim 1, wherein the application of the first voltage comprises applying the first voltage across a Vcc connection and a GND connection of the unauthenticated IC device.

3. The method of claim 1, wherein the determining the one or more variability values comprises determining the one or more variability values based on aggregating the first difference with the second difference.

4. The method of claim 1, wherein the determining the one or more variability values comprises:
   determining a first variability value of the one or more variability values based on the first difference; and
   determining a second variability value of the one or more variability values based on the second difference.

5. The method of claim 1, wherein the one or more variability values comprise one or more r-squared values.

6. The method of claim 1, further comprising:
   applying a steady-state voltage to the unauthenticated IC device;
   applying, while applying the steady-state voltage, an excitation signal to an input of the unauthenticated IC device;
   detecting, using a voltage detector that is in-line with a Vcc connection of the unauthenticated IC device, and based on the applied steady-state voltage and the applied excitation signal, a tested conducted electromagnetic interference (EMI) value of the unauthenticated IC device; and
   determining, based on a difference between the tested conducted EMI value and an expected conducted EMI value, that a second threshold is not satisfied, wherein the expected conducted EMI value is associated with the authenticated IC device, and wherein the outputting further comprises outputting a second indication that the second threshold is not satisfied.

7. The method of claim 6, further comprising determining that the unauthenticated IC device is a counterfeit device based on determining that both the threshold and the second threshold are not satisfied.

8. A method comprising:
   applying, while applying a steady-state voltage to an unauthenticated integrated circuit (IC) device, an excitation signal to an input of the unauthenticated IC device;
   detecting, using a voltage detector that is in-line with a Vcc connection of the unauthenticated IC device, and based on the applied steady-state voltage and the applied excitation signal, a tested conducted electromagnetic interference (EMI) value of the unauthenticated IC device;
   determining, based on a difference between the tested conducted EMI value and an expected conducted EMI value, that a threshold is not satisfied, wherein the expected conducted EMI value is associated with an authenticated IC device; and
   outputting an indication that the threshold is not satisfied.

9. The method of claim 8, wherein the detecting the tested conducted EMI value comprises detecting a high frequency signal on the Vcc connection of the unauthenticated IC device.

10. The method of claim 8, wherein the detecting the tested conducted EMI value comprises detecting a high frequency signal output from a high pass filter applied to an output of the Vcc connection.

11. The method of claim 10, wherein the detecting the tested conducted EMI value comprises performing lossy integration, based on the high frequency signal, to determine the tested conducted EMI value.

12. The method of claim 11, wherein the detecting the tested conducted EMI value comprises performing a squaring operation, based on the high frequency signal, to determine the tested conducted EMI value.

13. The method of claim 8, further comprising:
   determining, based on separate applications of a plurality of different voltages to the unauthenticated IC device, a plurality of tested quiescent current (QC) values;
   determining, based on comparing the plurality of tested QC values with a plurality of expected QC values associated with the authenticated IC device, one or more variability values; and
   determining, based at least in part on the one or more variability values, that a second threshold is not satisfied.

14. The method of claim 13, further comprising determining that the unauthenticated IC device is a counterfeit device based on determining that both the threshold and the second threshold are not satisfied.

15. A method comprising:
   determining, based at least in part on a first difference between a first tested quiescent current (QC) value and a first expected QC value, and a second difference between a second tested QC value and a second expected QC value, that a first threshold is not satisfied, wherein the first tested QC value and the second tested QC value are associated with an unauthenticated integrated circuit (IC) device, and wherein the first expected QC value and the second expected QC value are associated with an authenticated IC device;

determining, using a voltage detector that is in-line with a Vcc connection of the unauthenticated IC device, a tested conducted electromagnetic interference (EMI) value;

determining, based on a difference between the tested conducted EMI value and an expected conducted EMI value, that a second threshold is not satisfied, wherein the tested conducted EMI value is associated with the unauthenticated IC device, and wherein the expected conducted EMI value is associated with the authenticated IC device; and outputting, based on determining that at least one threshold of the first threshold or the second threshold is not satisfied, an indication that the at least one threshold is not satisfied.

16. The method of claim 15, wherein the determining the tested conducted EMI value comprises:

applying a steady-state voltage to the unauthenticated IC device;

applying, while applying the steady-state voltage, an excitation signal to an input of the unauthenticated IC device; and determining, based on the applied steady-state voltage and the applied excitation signal, the tested conducted EMI value of the unauthenticated IC device.

17. The method of claim 16, wherein the tested conducted EMI value is based on high frequency feedback, on the Vcc connection, from the applied excitation signal.

18. The method of claim 17, wherein the determining the tested conducted EMI value comprises performing lossy integration, based on the high frequency feedback, to determine the tested conducted EMI value.

19. The method of claim 15, wherein the first tested QC value is responsive to a first voltage across the Vcc connection and a GND connection of the unauthenticated IC device.

20. The method of claim 15, further comprising:

determining that the first threshold is not satisfied based on one or more r-squared values; and determining the one or more r-squared values based on the first difference and the second difference.

* * * * *